United States Patent Office 3,634,480
Patented Jan. 11, 1972

3,634,480
COMPLEXES CONTAINING ALUMINUM CHLORHYDROXIDE
Henry F. Sheffield, Millington, N.J., assignor to Summit Research Laboratories, Inc., Somerset, N.J.
No Drawing. Continuation-in-part of application Ser. No. 541,120, Apr. 8, 1966. This application Oct. 10, 1969, Ser. No. 866,144
Int. Cl. C07f 3/06
U.S. Cl. 260—429.9                                        7 Claims

ABSTRACT OF THE DISCLOSURE

Novel complexes of aluminum chlorhydroxide, a known antiperspirant, with phenolsulfonic acid or certain phenolsulfonates known to have deodorant activity, due to their solubility in anhydrous alcohols, and the compatibility of their alcohol and aqueous alcohol solutions with non-polar solvents, are useful in the formulation of cosmetic compositions and, more particularly, aerosol antiperspirant and deodorant products.

---

This application is a continuation-in-part of my earlier co-pending application Ser. No. 541,120, filed Apr. 8, 1966 for Antiperspirant Compositions and now abandoned.

The present invention relates to novel complexes of aluminum chlorhydroxide, a known antiperspirant, with phenolsulfonic acid or certain phenolsulfonates known to have deodorant activity. The new complexes, due to their solubility in anhydrous alcohols, and the compatibility of their alcohol and aqueous alcohol solutions with non-polar solvents, are useful in the formulation of cosmetic compositions and, more particularly, aerosol antiperspirant and deodorant products.

As is well known salts of aluminum are commonly used to inhibit perspiration. Aluminum salts of strong acids, such as aluminum chloride, aluminum sulfate and aluminum sulfamate, for example, are effective antiperspirants, but are generally irritating to the skin, destructive to clothing and highly corrosive to the preferred metal containers, when used in effective concentrations. Aluminum salts of weaker organic acids, such as aluminum citrate and aluminum acetate, for example, are less effective as antiperspirants and therefore, are not generally used. Aluminum chlorhydroxide is a well-known and effective antiperspirant, which has become the material of choice, since it is less irritating to skin, destructive to clothing and corrosive to metal containers than aluminum salts of strong acids, and more effective as an antiperspirant than aluminum salts of weak acids. Although aluminum chlorhydroxide is highly desirable as an antiperspirant, it has the serious drawback that it is practically insoluble in ethyl alcohol and other organic solvents normally required in typical antiperspirant compositions, particularly those of the aerosol type, which employ fluorochlorohydrocarbon propellants in non-polar solvents.

Therefore, its an object of the present invention to enhance the solubility of aluminum chlorhydroxide in ethyl alcohol and other non-polar solvents, to provide solutions high in aluminum content which facilitate the formulation of effective antiperspirant cosmetic compositions.

It is another object of the invention to provide novel antiperspirant-deodorant complexes of aluminum chlorhydroxide and phenolsulfonic acid or certain phenolsulfonates, which complexes are soluble in ethyl alcohol and other non-polar solvents to provide solutions of high aluminum content.

It is yet another object of the invention to provide solutions in anhydrous or aqueous lower alkyl alcohols, of the novel antiperspirant-deodorant complexes of aluminum chlorhydroxide with phenolsulfonic acid or certain phenolsulfonates, which solutions are high in aluminum content and compatible with other non-polar solvents and fluorochlorohydrocarbon propellants.

It is still another object of the invention to provide antiperspirant-deodorant cosmetic products in stick, jelly, cream, lotion, roll-on, spray, aerosol or other form, containing effective amounts of aluminum chlorhydroxide.

The above and other objects of the present invention, which will be apparent from the detailed description below, are achieved by the preparation of novel complexes represented by the formula

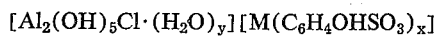

wherein M is H or an aluminum or zinc ion and $x$ is an integer equal to the valence of M, and $y$ is an integer from 2 to 4, and wherein the molar ratio of the aluminum chlorhydroxide moiety to the phenolsulfonate moiety of said complex is in the range from about 1 to 12:1. Briefly, the new complexes are formed by dissolving sufficient phenolsulfonic acid, or its zinc or aluminum salt, in an aqueous solution containing a known amount of the aluminum chlorhydroxide to provide the desired ratio of the two reactants. The resulting complexes may be used in the solution in which they are formed for applications in which water is not objectionable. For other applications the water may be removed from the solution by any suitable means, such as evaporation for example, to provide a dry stable complex, which can be ground to a powder and dissolved in alcohol or other non-polar solvents for use.

The novel aluminum chlorhydroxide phenolsulfonic acid or zinc or aluminum phenolsulfonate complexes formed in this way are astringents which are especially useful in the preparation of antiperspirant and deodorant cosmetic products due to their high solubility in anhydrous alcohols, water, aqueous alcohols and other solvents. The new complexes are especially useful in the preparation of aerosol antiperspirant-deodorant products due to their solubility in anhydrous alcohols or substantially anhydrous alcohols such as 95% ethyl alcohol to form solutions high in aluminum content, which are compatible with non-polar solvents and fluorochlorohydrocarbon propellants.

Any suitable aluminum chlorhydroxide compound may be used in the preparation of the new complexes. The ratio of aluminum to chloride may vary widely within the theoretical limits. Aluminum chloride itself, of course, has an aluminum chloride ratio of 1:3, and, therefore, represents the minimum, since replacement of part of the chloride with hydroxide will increase the ratio of aluminum to chloride. Basic aluminum chlorides, being mixtures, may be prepared in almost any aluminum to chloride ratio from 1:3 up to about 3:1. It is generally preferred, of course, to use materials of relatively high aluminum content, i.e., at least about 1:1 to about 2:1 or higher, in order to provide effective antiperspirant activity. Suitable aluminum chlorhydroxide compounds are commercially available, which have the empirical formula

in which the ratio of aluminum to chloride may vary from about 1.9 to 2.1:1.

In addition to phenolsulfonic acid itself, its zinc and aluminum salts have been found capable of forming the novel aluminum chlorhydroxide complexes of the present inventions, which have greater solubility in anhydrous and aqueous alcohols and other solvents than aluminum chlorhydroxide itself. Although each of these complexes have excellent solubility in anhydrous ethyl alcohol, zinc phenolsulfonate, is especially preferred.

As noted above, the novel complexes of the present invention are prepared from the desired phenolsulfonic acid or zinc or aluminum salts thereof and an aqueous solution of aluminum chlorhydroxide. More specifically, and by way of example, a weighed amount of aluminum chlorhydroxide is dissolved in water to form a solution of any suitable concentration but, preferably, containing about 50% by weight of the salt. The desired amount of zinc phenolsulfonate, for example, is then dissolved in the aqueous aluminum chlorhydroxide solution to give the desired molar ratio of one to the other. As stated above, the ratio may vary from 1 to 12 moles of aluminum chlorhydroxide to one mole of the zinc phenosulfonate, aluminum phenolsulfonate or sulfonic acid. The resulting solution of the desired complex may be used as such, or the dry stable complex may be isolated if desired, by removing the water of solution by any suitable means.

For example, the solution may be heated at 50° C. until all of the water, except that which is bound to the aluminum chlorhydroxide, is evaporated thus producing a dry, stable complex of the present invention. The new complexes, when dried, have been found to contain about 2–4 moles of bound water per mole of the whole aluminum chlorhydroxide-phenolsulfonate complex.

It has been found that the complexes of the present invention prepared in the above manner and ground to a powder are highly soluble, not only in concentrated aqueous alcohol solutions containing from 50–95% alcohol, by weight, but in anhydrous alcohols, as well. Such alcoholic solutions have been used to prepare finished cosmetic formulations containing the complexes in concentrations effective to provide excellent antiperspirant and deodorant protection.

While the prepartion, identity and proportions of the ingredients of the new complexes are known, the exact nature of the reaction by which the complexes are formed and the chemical structure of these complexes are yet to be established. It is apparent, however, that a chemical reaction does take place in forming the complexes, since there is a marked change in the solubility of the complexes as compared to the reactants, and especially the aluminum chlorhydroxide. The most profound, and useful, change in solubility provided by the new complexes is that they are highly soluble in anhydrous, monohydric loweralkyl alcohols, having from 1 to 3 carbon atoms and, preferably, ethyl or isopropyl alcohols. The most commonly used alcohol of this group, of course, is ethyl alcohol. The complexes are soluble in ethyl alcohol to the extent of more than 100% by weight, whereas aluminum chlorhydroxide alone is too insoluble in these alcohols to provide concentrations effective for antiperspirant purposes. In this connection it is noted that about 18 to 22% and preferably about 20% by weight of aluminum chlorhydroxide is required in a cosmetic product to provide effective antiperspirant protection. In order to dissolve 20% by weight of aluminum chlorhydroxide in ethyl alcohol, the solution must contain at least about 40% water, which is far more water that can be tolerated in many cosmetic formulations, and is definitely more than is compatible with aerosol propellants in products of this type.

It has also been found that the anhydrous alcohol solutions of the new complexes are capable of dissolving substantial amounts of other organic solvents frequently required in cosmetic formulations, such as ethylene and diethylene glycol, benzene, benzin, acetone, ether, chloroform and various fluorochlorohydrocarbons, such as "Freons."

Still further, it has been found that even aqueous alcohol solutions of the new complexes containing up to 10% of water are compatible with fluorochlorohydrocarbon propellants, and that such solutions containing up to 40–50% water by weight are compatible with other organic solvents to provide clear solutions or miscible mixtures without precipitation.

The unusual solubility of the new complexes is illustrated by the data in the Table I below.

TABLE I

Solubility of aluminum chlorhydroxide-zinc phenolsulfonate complexes

Solubility in grams/100 grams of solvent:
Anhydrous ethyl alcohol _____ 100
95% ethyl alcohol _____ 100
Anhydrous methanol _____ 100
Water _____ 100
Ethylene glycol _____ 25
Diethylene glycol _____ 25
Isopropyl alcohol _____ 25
Benzene _____ 0.5

40% by weight solutions of aluminum chlorhydroxide-zinc phenolsulfonate complex in anhydrous ethyl alcohol are compatible with equal weights of the following solvents:

| Acetone | Ethyl ether | Chloroform |
| Benzene | Benzin | Freon TF [1] |

[1] "Freon TF," also known as "Freon 113," which are trademarks for trichlorotrifluoroethane (CCl$_2$F—CClF$_2$) sold by E. I. du Pont de Nemours & Company, Wilmington, Del.

For purposes of comparison with the better than 100% solubility of the new complexes in anhydrous alcohol, and the still greater solubility of the complexes in aqueous alcohol, Table II below shows the limited solubility of aluminum chlorhydroxide alone in aqueous ethyl alcohol.

TABLE II

| Aqueous ethyl alcohol, percent by weight | | Solubility limit of aluminum chlorhydroxide, percent by weight [1] |
| --- | --- | --- |
| Alcohol | Water | |
| 72 | 28 | 12 |
| 60 | 40 | 24 |
| 54 | 46 | 30 |
| 50 | 50 | 34 |

[1] Approximate values estimated from the data of Govette and de Navarre, The American Perfumer and Essential Oil Review, April 1947, p. 365.

It will be seen from Table II above that in order to dissolve sufficient aluminum chlorhydroxide in aqueous alcohol to provide a solution effective for antiperspirant purposes, i.e., containing about 20% of the salt by weight, that about 40% water must be present to provide solution. This, of course, does not take into account the fact that the finished cosmetic product produced from such a solution would have a final salt concentration of less than 20% due to the necessity for adding other ingredients to the formulation.

It is seen, therefore, that it is difficult to produce an effective antiperspirant cosmetic formulation based on aluminum chlorhydroxide alone even if very substantial quantities of water can be tolerated. As seen from Table II, as the percentage of water is reduced below 40%, the solubility of the aluminum salt falls off so rapidly that effective antiperspirant formulations cannot be achieved. As seen from Table I on the other hand, the novel complexes of the present invention are soluble to the extent of more than 100% by weight in anhydrous ethyl alcohol, and, moreover, that the resulting solutions are compatible with equal weights of other non-polar solvents. This permits the formulation of aerosol products, since the fluorochlorohydrocarbon propellants are sufficiently soluble in the nonpolar solvents but not in the highly aqueous alcohol solutions required to dissolve sufficient aluminum chlorhydroxide alone.

The invention will now be described in greater detail in the following specific examples.

EXAMPLE I

Preparation of aluminum chlorhydroxide-zinc phenolsulfonate complex

$$6(Al_2(OH)_5Cl \cdot 2.36H_2O)(Zn(C_6H_4OHSO_3)_2)$$

(A) To prepare a complex of the present invention with a 6 to 1 molar ratio of aluminum chlorhydroxide to metal phenolsulfonate, 30 parts zinc phenolsulfonate N.F. were dissolved in 140.4 parts of 50% aluminum chlorhydroxide solution containing 23.5% $Al_2O_3$ with agitation and heating as necessary. The solution was poured into shallow trays and the water removed by evaporation at 50° C. until the dried product was equal to 92.4 parts. The product thus obtained has the following composition:

| Ingredient: | Parts by wt. |
|---|---|
| Al | 18.9 |
| $Al_2O_3$ | 35.7 |
| Cl | 12.4 |
| Zn | 3.8 |
| $H_2O$ (bound) | 14.9 |
| Zinc phenolsulfonate | 20.2 |

More than 10 grams of the above dried complex is soluble in 10 grams of either 200 proof ethyl alcohol, 190-proof ethyl alcohol or water. The solvent can be evaporated from each of these solutions to give glassy solids without crystalization. The solids can be further dried to an amorphous aggregate.

The complex prepared above contains aluminum chlorhydroxide and zinc phenolsulfonate in a molar ratio of 6:1.

The procedure of Example I above can be employed with phenolsulfonic acid or aluminum phenolsulfonate and with appropriate variation of the ratios of the reactants to form other complexes of the invention with from 1 to 12 moles of aluminum chlorhydroxide per mole of metal phenolsulfonate or phenolsulfonic acid.

(B) The general procedure of part A above was repeated except that the following materials were mixed together in the proportions indicated in preparations (1), (2) and (3) below, all parts being by weight.

|  | (1) | (2) | (3) |
|---|---|---|---|
| Aluminum chlorhydroxide (50% aqueous solution) | 4.8 | 15.8 | 17.6 |
| Phenolsulfonic acid (65% aqueous solution) | 11.8 | 3.2 | 1.8 |

After drying the resulting mixtures as in part A above, it was found that the resulting dried complexes were infinitely soluble in alcohol to produce useful antiperspirant solutions.

(C) The general procedure of parts A and B above was repeated except that the following materials were mixed together in the proportions indicated in preparations (1), (2) and (3) below, all parts being by weight.

|  | (1) | (2) | (3) |
|---|---|---|---|
| Aluminum chlorhydroxide (50% aqueous solution) | 86.8 | 156.2 | 182.3 |
| Aluminum phenolsulfonate (45% aqueous solution) | 161.8 | 48.6 | 28.3 |

As previously, on drying to produce dried complexes, these products were soluble in alcohol to produce useful antiperspirant solutions.

The following typical formulations are illustrative of a few of the ways in which the new complexes may be used in cosmetics. Many other formulations will be obvious to those skilled in the art.

EXAMPLE II

Aerosol antiperspirant composition

| Ingredient: | Parts by wt. |
|---|---|
| Aluminum chlorhydroxide-zinc phenolsulfonate complex (six to one molar ratio) | 27 |
| Anhydrous ethyl alcohol | 45 |
| Propylene glycol | 2 |
| Isopropyl myristate | 1 |
| Perfume oil | Qs. |
| Propellent (fluorohydrocarbon) | 25 |

The above ingredients, including the dry complex of Example I were compounded by conventional procedures to produce an aerosol antiperspirant composition. Finished formulations of aerosol antiperspirants such as the formulation given above, containing complexes of the present invention, have been found to be much less corrosive to metal containers and valves used for dispensing such products than other known aluminum antiperspirant products. Due to the enhanced solubility of the aluminum chlorhydroxide obtained by forming its complex with zinc phenolsulfonate according to the present invention, complete solution is achieved in the above formulation, thus obviating problems such as valve clogage usually associated with aerosol antiperspirants.

EXAMPLE III

Aerosol antiperspirant composition

| Ingredient: | Parts by weight |
|---|---|
| Aluminum chlorhydroxide-zinc phenolsulfonate complex | 21 |
| Anhydrous ethyl alcohol | 36 |
| Plasticizer (such as "Soluan 98"[1] and/or "Acetulan"[2] | 2-4 |
| Humectant (such as propyleneglycol) | 1-2 |
| Perfume | Qs. |
| Propellant ("Freon" 12/114 60/40 mixture[3]) | 40 |

[1] "Soluan 98" is a trademark for a soluble lanolin composition sold by American Cholesterol Co., Edison, N.J.
[2] "Acetulan" is a trademark for an acetylated, ethoxylated lanolin ester-ether derivative sold by American Cholesterol Co., Edison, N.J.
[3] "Freon" 12 and "Freon" 114 are trademarks for dichlorodifluoromethyl ($CCl_2F_2$) and dichlorotetrafluoroethane ($CClF_2$—$CClF_2$) respectively, sold by E. I. du Pont de Nemours & Co., Wilmington, Del.

EXAMPLE IV

Antiperspirant jelly composition

| Ingredient: | Parts by weight |
|---|---|
| Aluminum chlorhydroxide-zinc phenolsulfonate complex | 25 |
| Anhydrous ethyl alcohol | 70 |
| Propylene glycol | 4 |
| Isopropyl myristate | 1 |
|  | 100 |

The above ingredients, including a complex of the invention prepared according to the procedure of Example I, are formulated by conventional procedures to produce an antisperspirant jelly composition suitable for application to the human body. The aluminum chlorhydroxide metal phenolsulfonate complexes of the present invention also may be substituted in any of the standard cream type formulations with little or no further modification according to well known formulating techniques.

EXAMPLE V

Roll-on type antiperspirant composition

| Ingredient: | Parts by weight |
|---|---|
| Aluminum chlorhydroxide-zinc phenolsulfonate complex | 24 |
| Lanolin alcohol | 5 |
| Acetylated, ethoxylated lanolin ester-ether derivitive [1] | 2 |
| Cetyl alcohol | 2 |
| Glycerine | 2 |
| Polyoxy (40) stearate [2] | 4 |
| Magnesium aluminum silicate | 1 |
| Water or water and alcohol | 60 |
| Perfume | Qs. |
| Preservative | Qs. |

[1] Available as "Acetulan" from American Cholesterol Co., Edison, N.J.
[2] "Polyoxy (40)" stearate listed in U.S.P.

The above ingredients are formulated by conventional techniques to produce a roll-on type antiperspirant composition suitable for application to the human body.

It is noted that although the preferred aluminum chlorhydroxide-zinc phenolsulfonate complexes of the present invention have been recited in the illustrative examples above, that any of the other complexes of the invention could be substituted in said examples without change, for example, complexes containing sulfonic acid, aluminum or other metal sulfonates, in which the ratio of aluminum chlorhydroxide to sulfonic acid or sulfonate varies from 1 to 12:1. It has been found that it is useful to vary the ratio of the active ingredients within this range, since it produces complexes having varying physical characteristics in solution, thus permitting selection of a complex particularly suitable for use in any desired cosmeic formulation. This is highly desirable, since cosmetic formulations employing the new complexes as active ingredients may include stick, paste, jelly, cream, roll-on spray, aerosol or liquid compositions, useful as antiperspirants, deodorants, skin conditioners, pre-shave lotions and the like, which have widely divergent compositions. The increased solubility of the new complexes in alcohols and aqueous alcohols, as compared to aluminum chlorhydroxide, greatly facilitates the preparation of the stick, paste, jelly, cream, roll-on spray and liquid compositions. The solubility of the complexes in anhydrous alcohols, makes possible the formulation of aerosol products containing effective concentrations of the aluminum salt, which was not possible previously. It is also noted that nonpolar solvents such as acetone, benzene, benzin and ether may be added to the alcohol solutions of the new complexes without causing precipitation. This is advantageous since it permits the formulation of aerosol products in which the usual fluorochlorohydrocarbon propellants are dissolved in anhydrous alcohol solutions of the complxes. Solutions of the complexes in aqueous alcohols are also compatible with fluorochlorohydrocarbons in two phase systems.

As an example of the physical characteristics of the new complexes, it is noted that when the complexes are dried and dissolved in anhydrous ethyl alcohol to form 40% solutions by weight, the alcoholic solutions made from complexes containing aluminum chlorhydroxide and zinc phenolsulfonate in a molar ratio of from 8 to 12:1, yield clear viscous solid gels. Such solutions made from complexes in which the ratio of ingredients is from 1 to 7:1, yield clear non-viscous solutions. Solutions of both types may be mixed with other ingredients to formulate a wide variety of useful cosmetic products.

It will be apparent from the foregoing description that the present invention provides new aluminum-containing antiperspirant-deodorant complexes having great utility in formulating cosmetic products and, particularly, those of the aerosol type.

While the present invention has been described above with particular reference to the use of certain preferred embodiments thereof, it is to be understood that these embodiments are merely illustrative of many others which will be apparent to those skilled in the art and that they are not to be construed as limiting the scope of appended claims.

What is claimed is:

1. An alcohol soluble complex represented by the formula $$[Al_2(OH)_5Cl \cdot (H_2O)_y][M(C_6H_4OHSO_3)_x]$$

wherein M is H or an aluminum or zinc ion and $x$ is an integer equal to the valence of M, and $y$ is an integer from 2 to 4, and wherein the molar ratio of the aluminum chlorhydroxide moiety to the phensolsulfonate moiety of said complex is in the range from about 1 to 12:1.

2. A complex of claim 1 wherein the phenolsulfonic moiety is aluminum phenolsulfonate.

3. A complex of claim 1 wherein the phenolsulfonic moiety is zinc phenolsulfonate.

4. A complex of claim 1 wherein the phenolsulfonic moiety is phenolsulfonic acid.

5. A dry stable complex of claim 1.

6. A dry stable complex of claim 1 wherein the phenolsulfonic moiety is zinc phenolsulfonate and each mole of the complex contains 2 to 4 moles of bound water.

7. A method for increasing the solubility of aluminum chlorhydroxide in anhydrous and aqueous lower alkyl monohydric alcohols containing from 1 to 3 carbon atoms, which comprises: mixing aluminum chlorhydroxide with a member selected from the group consisting of phenolulphonic acid, zinc phenolsulfonate and aluminum phenolsulphonate in a ratio of 1 to 12 moles of the former to 1 mole of the latter, in a co-solvent for said ingredients to form a complex thereof having greater solubility in said alcohols than said aluminum chlorhydroxide.

References Cited

UNITED STATES PATENTS

| 3,018,223 | 1/1962 | Siegal | 260—448 R X |
| 3,405,153 | 10/1968 | Jones et al. | 260—448 R X |
| 3,553,316 | 1/1971 | Rubino | 260—429.9 X |

OTHER REFERENCES

Chemical Abstracts, Vol. 66, Article 68819s (1967).
Chemical Abstracts, Vol. 66, Article 22118j (1967).
Chemical Abstracts, Vol. 46, p. 10531i (1962).
Chemical Abstracts, Vol. 48, p. 958b (1954).

TOBIAS E. LEVOW, Primary Examiner

H. M. S. SNEED, Assistant Examiner

U.S. Cl. X.R.

260—448 R; 424—47